United States Patent [19]

Tanaka et al.

[11] Patent Number: 5,426,471
[45] Date of Patent: Jun. 20, 1995

[54] IMAGE PROJECTION SYSTEM

[75] Inventors: Takaaki Tanaka, Katano; Sinya Sannohe, Neyagawa, both of Japan

[73] Assignee: Matsushita Electric Industrial Co., Ltd., Osaka, Japan

[21] Appl. No.: 84,960

[22] Filed: Jul. 2, 1993

[30] Foreign Application Priority Data

Jul. 3, 1992 [JP] Japan .................................. 4-176606

[51] Int. Cl.⁶ .......................... H04N 3/23; H04N 9/31
[52] U.S. Cl. .................................... 348/745; 348/746; 348/747
[58] Field of Search ................ 348/744, 745, 746, 747, 348/750, 751, 779, 780, 784, 807; H04N 3/23, 3/233, 3/237, 5/74, 9/31; 359/40, 41, 738, 739, 740, 649; 353/31, 34, 48, 75

[56] References Cited

U.S. PATENT DOCUMENTS

| | | | |
|---|---|---|---|
| 4,210,928 | 7/1980 | Ohmori et al. | 348/746 |
| 4,376,949 | 3/1983 | Rowe | 348/746 |
| 4,432,011 | 2/1984 | Lehnert | 348/745 |
| 5,010,397 | 4/1991 | Hasegawa | 348/746 |
| 5,042,929 | 8/1991 | Tanaka et al. | |
| 5,103,302 | 4/1992 | Yoshida et al. | |
| 5,237,399 | 8/1993 | Inada et al. | 348/761 |
| 5,274,480 | 12/1993 | Hirai et al. | 359/40 |

FOREIGN PATENT DOCUMENTS

| | | |
|---|---|---|
| 2-116285 | 4/1990 | Japan . |
| 2-216983 | 8/1990 | Japan . |
| 3-111820 | 5/1991 | Japan . |

*Primary Examiner*—James J. Groody
*Assistant Examiner*—Michael H. Lee
*Attorney, Agent, or Firm*—Wenderoth, Lind & Ponack

[57] ABSTRACT

An image projection system which comprises a light source, a color separating optical means for separating rays of light from the light source into blue, green and red light components, first to third liquid crystal panels each having an image forming center and being operable to modulate the associated light component in response to a video signal applied thereto thereby to form an image in a corresponding color, first to third projection lens assemblies associated with the first to third liquid crystal panels for projecting imagewise modulated light components, carrying the images formed respectively by the first to third liquid crystal panels, onto a screen in a superimposed fashion to provide a color picture. The first and third liquid crystal panels are positioned on respective sides of the second light valve and also positioned with their image forming centers displaced relative to the associated optical axes of the first and third projection lens assemblies. An aperture stop is provided in each of the first and third projection lens assemblies and is decentered relative to the optical axis of the first or third projection lens assembly in a direction parallel to the direction of displacement of the associated first or third light valve so that the luminance of the projected color picture is uniform over the entire surface of the screen with color non-uniformity being minimized.

20 Claims, 6 Drawing Sheets

IMAGE PROJECTION SYSTEM

BACKGROUND OF THE INVENTION

1. Field of the Invention

The present invention relates to an image projection system designed to illuminate and then project an image displayed on a light valve onto a screen on an enlarged scale through a projection lens assembly.

2. Description of the Prior Art

To obtain an enlarged picture on a screen, a method is well known in which an image formed on a miniature light valve in response to a video signal applied thereto is illuminated by rays of light from a light source with the imagewise rays of light being subsequently projected through a projection lens assembly. FIG. 7 illustrates an image projection apparatus such as disclosed in, for example, the Japanese Laid-open Patent Publication No. 2-250015, in which liquid crystal panels are employed as light valves.

Referring to FIG. 7 for the discussion of the prior art image projection apparatus, the apparatus shown therein comprises a lamp 1, a converging optical apparatus 2 for converging rays of light from the lamp 1, a cut-off filter 3 for reflecting both ultraviolet rays of light and heat waves, a color separating optical means 7 including three dichroic mirrors 4, 5 and 6, three field lenses 8, 9 and 10, three liquid crystal panels 11, 12 and 13 of active matrix type, three projection lenses 14, 15 and 16, and a screen 17. White rays of light emitted from the lamp 1 are transformed by the converging optical apparatus 2 into a substantially parallel beam which subsequently enters the color separating optical means 7 after the ultraviolet rays of light and the heat waves have been reflected by the filter 3.

When the parallel beam enters the color separating optical means 7 in the manner described above, the beam is separated by the dichroic mirrors 4, 5 and 6 into blue, green and red light components which are, after having subsequently been passed through the respective field lenses 8, 9 and 10, transmitted to the liquid crystal panels 11, 12 and 13. The blue, green and red light components entering the liquid crystal panels 11, 12 and 13 are modulated by the liquid crystal panels 11, 12 and 13 in response to the applied video signal to form respective images which are subsequently transmitted as blue, green and red imagewise beams to the projection lenses 14, 15 and 16. These projection lenses 14, 15 and 16 then project the imagewise beams onto the screen 17 to effect a color image display.

In this prior art image projection apparatus, since the three projection lenses are employed, not only is the use of a color combining optical means required, but a lens having a relatively small focal length can be employed for each of the projection lenses, making it possible to manufacture the image projection apparatus as a whole in a compact size.

The illuminance E of the image projected on the screen can be given by the following equation:

$$E = E_0 \cdot K \cdot \cos^4 \omega \qquad (1)$$

wherein $E_0$ represent the illuminance at the center of the projected image in alignment with an optical axis of the projection lens, K represents the vignetting factor of the projection lens, and $\omega$ represents the field angle of the projection lens. Thus, the illuminance E at the screen is proportional to the product of the vignetting factor K multiplied by $\cos^4 \omega$.

In the prior art system shown in FIG. 7, since the three projection lenses have their own optical axes positioned at different locations, these projection lenses for projecting the blue, green and red imagewise beams, respectively have different field angles with respect to an arbitrarily chosen point on the screen and, therefore, the screen is illuminated by the blue, green and red imagewise beams in varying patterns of distribution of illuminance. FIG. 8 illustrates a graph showing a pattern of distribution of illuminance of each image, formed on the screen by the respective blue, green and red imagewise beams projected by the associated projection lens, with respect to the fourth power of the cosine of the field angle ($\cos^4 \omega$) of the associated projection lens.

As can be understood from the graph of FIG. 8, the prior art system shown in FIG. 7 has a problem in that the composite color image formed on the screen by combining the blue, green and red imagewise beams has an even distribution of color over the screen.

This color non-uniformity may be corrected either by modulating the video signals to be applied to the liquid crystal panels with luminance or by the use of a light attenuating filter. Any of these methods is such that the illuminance of one or two of the color imagewise beams projected on the screen is reduced to coordinate with that of the remaining imagewise beam or beams projected on the same screen, followed by an adjustment of the white balance thereby to compensate for the color non-uniformity, and therefore poses a problem in that the luminance of the image projected on the screen tends to be lowered.

Where the light attenuating filters are employed to make the illuminance of the blue, green and red beams projected on the screen substantially uniform over the screen, those filters must be have light transmittances sufficient to accommodate different $\cos^4 \omega$ exhibited by the respective projection lenses. The use of such filters in turn brings about an increase in cost of the optical system.

SUMMARY OF THE INVENTION

The present invention is therefore intended to provide an improved image projection system which is capable of providing a bright, clear image on a screen with the color non-uniformity minimized.

To this end, there is provided, in accordance with a preferred embodiment of the present invention, an image projection system which comprises a light source, a color separating optical means for separating rays of light from the light source into blue, green and red light components, first to third light valves each operable to modulate the associated light component in response to a video signal applied thereto thereby to form an image in a corresponding color, and first to third projection lens assemblies associated with the first to third light valves for projecting imagewise modulated light components, carrying the images formed respectively by the first to third light valves, onto a screen in a superimposed fashion to provide a color picture. Of the three light valves, the first and third light valves positioned on respective sides of the second light valve have their image forming centers and are positioned with their image forming centers offset laterally relative to the associated optical axes of the first and third projection lens assemblies. At the same time, at least the first and third projection lens assemblies associated with the first and third light valves are provided with respective aperture stops each decentered relative to the optical axis of the first or third projection lens assembly in a direction parallel to the direction of offset of the associated first or third light valve.

According to another preferred embodiment of the present invention, there is provided an image projection system which comprises a light source, a color separating optical means for separating rays of light from the light source into blue, green and red light components, first to third light valves each operable to modulate the associated light component in response to a video signal applied thereto thereby to form an image in a corresponding color, a color combining optical means for combining together the imagewise modulated blue, green and red light components emerging from the first to third light valves, and a projection lens assembly for projecting the imagewise modulated light components, carrying the images formed respectively by the first to third light valves, onto a screen in a superimposed fashion to provide a color picture. Of the three light valves, the first and third light valves positioned on respective sides of the second light valve have their image forming centers and are positioned with their image forming centers displaced relative to the optical axis of the projection lens assembly. At the same time, this projection lens assembly is provided with an aperture stop decentered relative to the optical axis of the projection lens assembly in a direction parallel to the direction of displacement of any one of the light valves.

According to the present invention, each of at least the first and third projection lens assemblies corresponding to the first and third light valves which are positioned with their image forming centers offset laterally from the associated optical axes of such first and third projection lens assemblies is provided with an aperture stop decentered from the respective optical axis of the first or third projection lens assembly in a direction parallel to the direction of offset of the image forming center of the corresponding first or third light valve.

It is to be noted that the plane in which the principal ray travelling within the field angle of each of the projection lens assemblies while no decentered aperture stop is employed intersects the optical axis of the respective projection lens assembly is hereinafter referred to as a principal aperture plane. The decentered aperture stop is disposed in the vicinity of the principal aperture plane so that the beam traveling along the optical axis of the respective projection lens assembly will not be vignetted by the aperture stop.

The illuminance of each of the images projected onto the screen by means of the associated projection lens assemblies can be determined by the foregoing equation (1). However, by controlling the vignetting factor of each of the projection lens assemblies, a change in cos⁴ω $\cos^4\omega$ can be compensated for to render the respective images to be projected in a uniform illuminance on the screen by means of the associated projection lens assemblies. Each of the decentered aperture stops provided for the first and third projection lens assemblies serves to reduce in effect the vignetting factor of the associated projection lens assembly tending to exhibit a reduced field angle with respect to an arbitrarily chosen point on the screen, thereby to reduce the light flux passing therethrough. It also serves to increase in effect the vignetting factor of the projection lens assembly tending to exhibit an increased field angle thereby to increase the light flux passing therethrough. In such case, the F-number of the projection lens assembly must be smaller than that required in the projection optical system as a whole.

Thus, the disposition of the decentered aperture stop in the vicinity of the principal aperture plane of each of the projection lens assemblies in accordance with the present invention is effective in that the respective illuminance of the blue, green and red imagewise light components projected on the screen, which tend to differ from each other due to different field angles of the projection lens assemblies, can be rendered substantially uniform over the screen.

Thus, according to the present invention, the use of the decentered aperture stops in association with the projection lens assemblies is effective to control the vignetting factor of each of the projection lens assemblies. Controlling of the vignetting factors of the projection lens assemblies in turn results in a compensation for a change in illuminance at the screen which would result from the different field angles of these projection lens assemblies. Therefore, the image projection system of the present invention is effective to considerably minimize the color non-uniformity of the color image formed on the screen by combining the light components of three primary colors.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
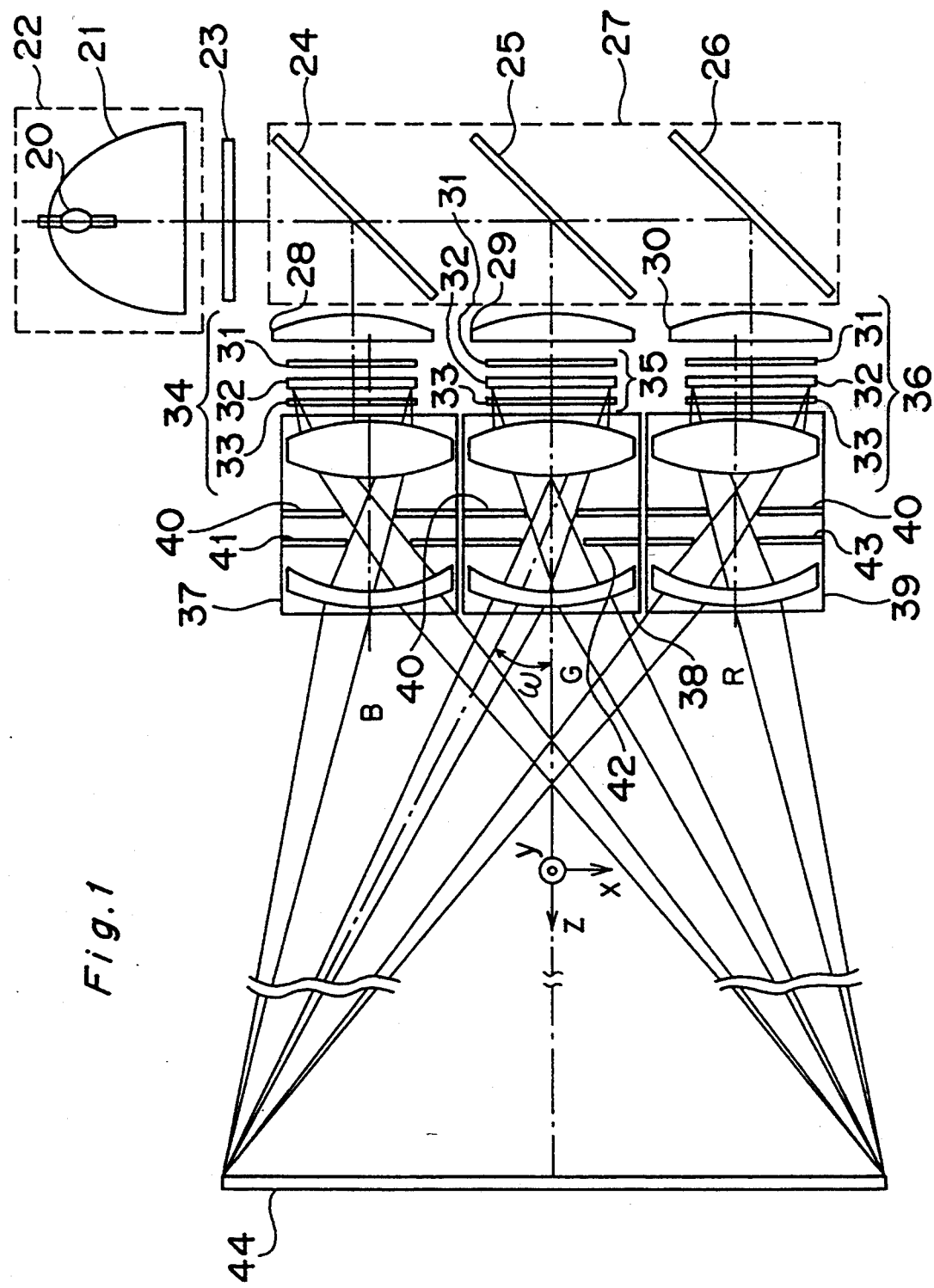
FIG. 1 is a schematic side view of an image projection system according to a first preferred embodiment of the present invention.

With reference to FIG. 1 showing an image projection system according to a first preferred embodiment of the present invention, the system includes a light source 22 including a lamp 20 such as, for example, a metal halide lamp, a xenon lamp or a halogen lamp, and a concave mirror 21; a cut-off filter 23 capable of reflecting ultraviolet and infrared regions of wavelength; a color separating optical means 27 including first to third dichroic mirrors 24, 25 and 26 for reflecting blue, green and red light components, respectively; first to third field lenses 28, 29 and 30; first to third light valves employed in the form of liquid crystal panels 34, 35 and 36 each including polarizing plates 31 and 33 and a respective liquid crystal cell 32 having a switching element for each pixel and intervening between the polarizing plates 31 and 33; and first to third projection lens assemblies 37, 38 and 39.

Reference numeral 40 represents a primary aperture incorporated in each of the projection lens assemblies 37 to 39; reference numerals 41, 42 and 43 represent auxiliary apertures incorporated in the respective projection lens assemblies 37 to 39 and positioned on one side of the primary apertures 40 remote from the associated first to third liquid crystal panels 34 to 36; and reference numeral 44 represents a screen which may be either a light transmissive type or a light reflective type.

According to the optical system shown in FIG. 1, rays of light emitted from the lamp 20 are transformed by the concave mirror 21 into a substantially parallel beam which subsequently enters the color separating optical means 27 after the ultraviolet and infrared rays of light have been reflected by the filter 23. When the parallel beam enters the color separating optical means 27, the beam is separated successively by the dichroic mirrors 24 to 26 into blue, green and red light components, in a manner well known to those skilled in the art, which light components are then reflected therefrom towards the associated field lenses 28 to 30. Each of these field lenses 28, 29 or 30 is operable to converge rays of light passing through a peripheral region of the respective liquid crystal panel 34, 35 or 36 so as to enter the associated projection lens assembly 37, 38 or 39. The blue, green and red light components emerging outwardly from the field lenses 28 to 30 are transmitted to the liquid crystal panels 34 to 36.

Each of the liquid crystal display panels 34, 35 or 36 is of an active matrix type including the twisted-nematic liquid crystal cell 32 with the polarizing plates 31 and 33 disposed on respective sides thereof to form a crossed Nicols and is operable to form the image as a function of change in transmittance produced in response to the applied video signal. Thus, the blue, green and red light components entering the liquid crystal panels 34 to 36, respectively, are modulated by the liquid crystal panels 34 to 36 in response to the applied video signal to form respective images which are subsequently transmitted as blue, green and red imagewise beams to the projection lenses 37 to 39 which are disposed in side-by-side relationship with their optical axes extending parallel to each other. These projection lenses 37 to 39 then project the imagewise beams onto the screen 44 to effect a color image display. It is, however, to be noted that, since each of the projection lens assemblies 37 to 39 includes the primary and auxiliary apertures 40 and 41, 42 or 43, the cross-section of the bundle of rays of light forming the associated light component is regulated as the associated light component pass therethrough.

In order for blue, green and red images, projected by the respective projection lens assemblies 37 to 39, to be substantially precisely superimposed on the screen to form a high-fidelity color picture corresponding to that televised or videoed and, hence, carried by the video signal, the three liquid crystal panels are so disposed relative to each other that geometric centers of respective image forming plane of the first and third liquid crystal panels 34 and 36 on the respective sides of the intermediate, that is, second, liquid crystal 35 are offset a predetermined distance from the associated optical axes of the corresponding first and third projection lens assemblies 37 and 39 in a direction laterally outwardly with respect to the optical axis of the second projection lens assembly 38 and, at the same time, the first and third liquid crystal panels 34 and 36 have their image forming planes slightly tilted in respective senses opposite to each other.

In the first to third projection lens assemblies 37 to 39, the primary apertures 40 are so disposed as to coaxially align with the respective optical axes of the first to third projection lens assemblies 37 to 39. When it comes to the auxiliary apertures, the auxiliary aperture 42 in the second projection lens assembly 38 is coaxially aligned with the optical axis of such second projection lens assembly 38, whereas the auxiliary apertures 41 and 43 in the first and third projection lens assemblies 37 and 39 are so disposed as to be offset and, hence, decentered, a predetermined distance from the associated optical axes of the corresponding first and third projection lens assemblies 37 and 39 in a direction laterally inwardly with respect to the optical axis of the second projection lens assembly 38. With the auxiliary apertures 41 and 43 so offset as described above, these auxiliary apertures 41 and 43 are referred to as decentered auxiliary apertures.

The direction in which each of the decentered auxiliary apertures 41 and 43 is offset relative to the optical axis of the associated projection lens assembly 37 or 39 is opposite to the direction in which the corresponding liquid crystal panel 34 or 36 is offset relative to the optical axis of the associated projection lens assembly 37 or 39. Hence, where the first liquid crystal panel 34 is offset laterally outwardly in a direction shown by the arrow X, the decentered auxiliary aperture 41 in the first projection lens assembly 37 aligned with the first liquid crystal panel 34 is offset laterally inwardly in a direction opposite to the direction X. This description similar to the above, but in an opposite sense, equally applies to the relationship between the auxiliary aperture 43 in the third projection lens assembly 39 and the third liquid crystal panel 36.

Figure 2:
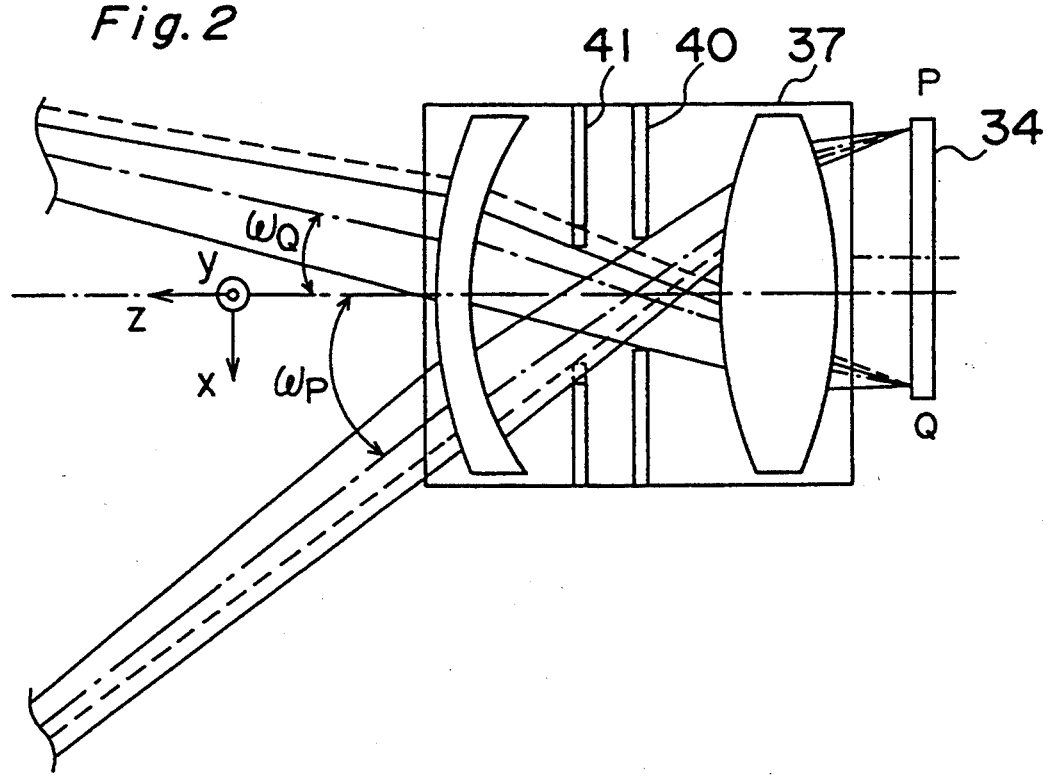
FIG. 2 is a schematic side view, on an enlarged scale, of one of projection lens assemblies employed in the image projection system, showing how rays of light travel through the projection lens assembly when a corresponding decentered aperture stop is employed and not employed.

The reason that one of the apertures employed in each of the first and third projection lens assemblies 37 and 39, which is positioned remotest from the associated liquid crystal panel 34 or 36, that is, the auxiliary aperture 41 or 43, is chosen to be decentered as discussed above is because the vignetting factor can be increased or reduced as the field angle $\omega$ of the associated projection lens assembly 37 or 39 increases or decreases, respectively, the details of which will be discussed subsequently with particular reference to FIG. 2 illustrating only the first projection lens assembly 37 for the sake of brevity.

In the optical system shown in FIG. 1, assuming that the effective F-number at which the size of an image of the light source 22 formed on the pupil of each of the projection lens assemblies 37 to 39 matches with the size of the pupil of each projection lens assembly 37 to 39 is 4.0, the F-number of each of the projection lens assemblies 37 to 39 must necessarily be chosen to be of a value smaller than the effective F-number as a function of the amount of offset of each decentered auxiliary apertures 41 and 43. In this system, each primary aperture 40 serves to regulate the on-axis light flux and is therefore determinative of the effective F-number, whereas each decentered auxiliary aperture 41 or 43 serves to regulate the off-axis light flux.

Referring now to FIG. 2, there is illustrated how the on-axis and off-axis rays of light travel through, for example, the first projection lens assembly 37. As shown therein, the auxiliary aperture 41 having a round opening is disposed on one side of the primary aperture 40 adjacent the screen 44 (FIG. 1) having been offset or decentered laterally and in a direction parallel to the primary aperture 40 and close towards the intermediate projection lens assembly 38 (FIG. 1), i.e., in the direction shown by the arrow X perpendicular to the optical axis of such projection lens assembly 37. Since the associated liquid panel 34 is so disposed with its image forming center offset laterally with respect to the optical axis of the projection lens assembly 37 in the direction counter to the direction of offset of the auxiliary aperture 41, the field angle $\omega_P$ of the projection lens assembly 37 at a point shown by P is greater than the field angle $\omega_Q$ thereof at a different point shown by Q. Accordingly, the law of the fourth power of the cosine of the field angle ($\cos^4\omega$) speaks that the illuminance measured at a point on the screen which corresponds to the point P is lower than that at a different point on the screen which corresponds to the point Q. In view of this, the size and the amount of offset (decentering amount) of the decentered auxiliary aperture 41 is so chosen as to satisfy the following relationship:

$$K_P/K_Q = (\cos^4\omega_Q)/(\cos^4\omega_P) \qquad (2)$$

wherein $K_P$ and $K_Q$ represent the vignetting factors of the projection lens assembly 37 at the points P and Q, respectively. In such case, however, in order to prevent the on-axis light flux from being restricted by the decentered auxiliary aperture 41, the decentered aperture 41 is spaced a predetermined distance from the primary aperture 40 in a direction shown by the arrow Z, that is, away from the liquid crystal panel 34.

In FIG. 2, the light flux shown by the solid lines represent those passing through the points P and Q when the auxiliary aperture 41 is decentered in the projection lens assembly 37, whereas the light flux shown by the phantom lines represent those passing through the points P and Q when the auxiliary aperture is decentered. As shown therein, the light fluxes passing through the points P and Q at which the field angle $\omega$ increases and decreases, respectively, due to the decentering of the auxiliary aperture 41 in the direction X increases and decreases, respectively.

The foregoing description made with reference to FIG. 2 in connection with the first projection lens assembly 37 equally applied to the third projection lens assembly 39 employing the decentered auxiliary aperture 43 but in a sense opposite to that described with reference to FIG. 2.

Thus, it is clear that the use of the decentered auxiliary apertures 41 and 43 for controlling the respective vignetting factors of the first and third projection lens assemblies 37 and 39 is effective to increase the light flux passing at an increased field angle of the respective projection lens assembly and to decrease the light flux passing at a reduced field angle of the same projection lens assembly.

Figure 3:
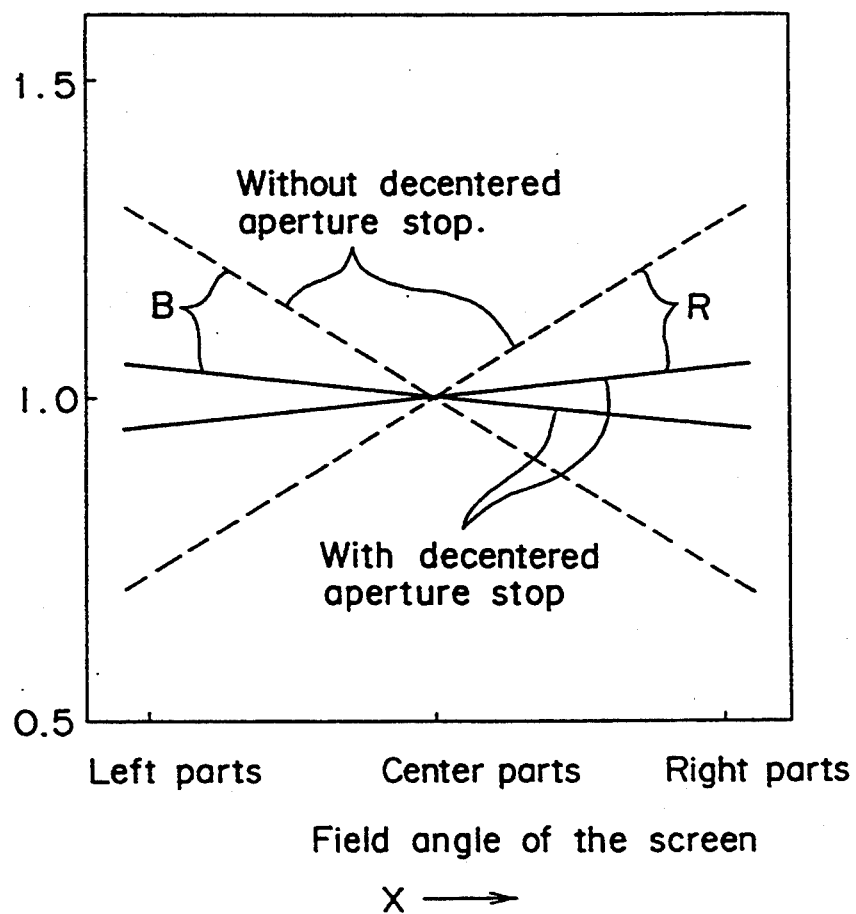
FIG. 3 is a graph showing how the rays of light having passed through the projection lens assemblies are distributed on a screen when projected thereon.

FIG. 3 illustrates a graph showing how illuminances of the blue and red imagewise light components projected on the screen through the first and third projection lens assemblies 37 and 39 are distributed on the screen relative to the illuminance of the green imagewise light component projected on the same screen through the second projection lens assembly 38. Since the first to third projection lens assemblies 37 to 39 are juxtaposed in the direction shown by the arrow X (for example, in a direction parallel to the transverse or horizontal direction of the screen 44), the pattern of distribution of the illuminances shown in FIG. 3 is taken along the transverse direction of the screen 44 parallel to the direction X. Solid lines represent the illuminances of the blue and red imagewise light components projected respectively by the first and third projection lens assemblies 37 and 39 utilizing the decentered auxiliary apertures 41 and 43, whereas dotted lines represent the illuminances of the blue and red imagewise light components projected respectively by the associated projection lens assemblies with none of the decentered auxiliary apertures 41 and 43 having been employed.

It is clear from the graph of FIG. 3 that, where none of the decentered auxiliary apertures 41 and 43 are employed in the first and third projection lens assemblies 37 and 39, that portion of the projected color picture which appears at a left-hand portion of the screen is highlighted blue whereas that portion of the projected color picture which appears at a right-hand portion of the screen is highlighted red, thereby presenting a color non-uniformity over the entire surface of the screen. It is also clear from the graph of FIG. 3 that, where the decentered auxiliary apertures 41 and 43 are employed in the first and third projection lens assemblies 37 and 39, such a color non-uniformity has been minimized.

Thus, according to the foregoing embodiment of the present invention, a change in distribution of the respective illuminances of the blue, green and red imagewise light components projected on the screen which would result from the differing field angles $\omega$ of the individual projection lens assemblies associated with the three primary colors can be compensated for to accomplish a substantially high-fidelity display of the color picture without the luminance thereof being reduced substantially. The disposition of the auxiliary aperture within each of the first and third projection lens assemblies in a decentered fashion as described above can readily be accomplished, and the optical system as a whole can be assembled at a reduced cost as compared with that employing a color compensating means such as, for example, the light attenuating filters.

Where the single decentered auxiliary aperture is employed in each of the first and third projection lens assemblies 37 and 39, it may occur that a relatively large amount of offset over which the auxiliary aperture is to be decentered is required and, hence, the light flux passing through the effective F-number of the respective projection lens assembly will be vignetted. This can be avoided by the employment of an additional decentered auxiliary aperture in each of the first and third projection lens assemblies 37 and 39 as shown by 45 in FIG. 4. It is to be noted that, in the modification shown in FIG. 4, only one of the first and third projection lens assemblies, that is, the first projection lens assembly 37, is shown for the sake of brevity as is the case with FIG. 2 and that the following description made with reference to FIG. 4 should be understood as equally applicable to the third projection lens assembly 39.

Figure 4:
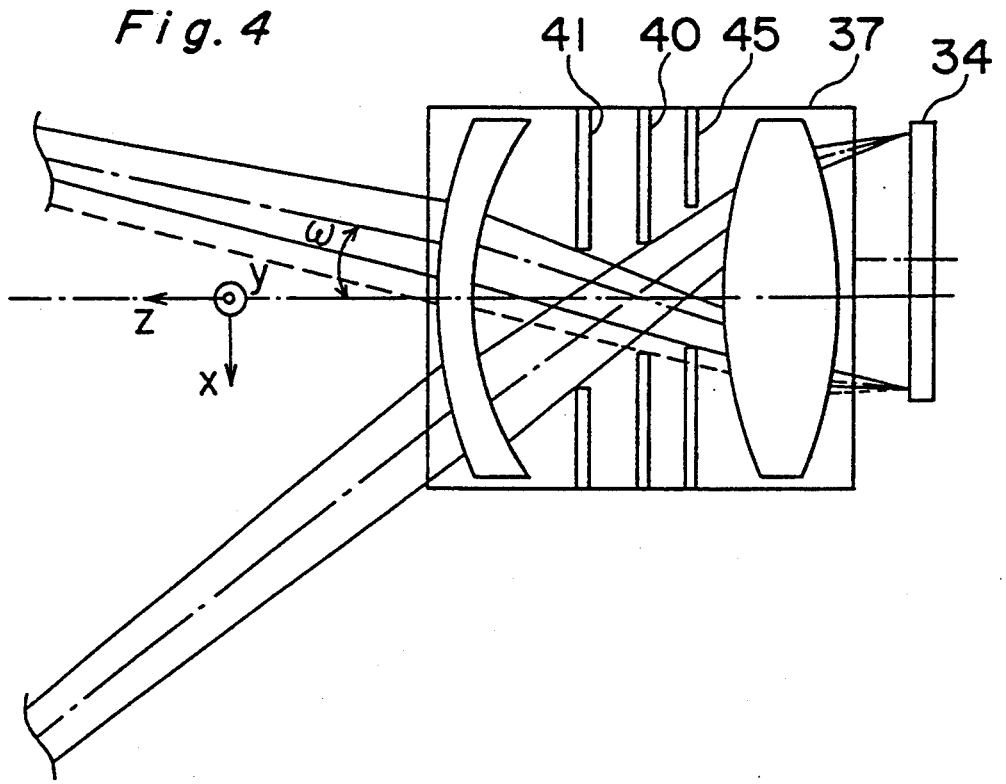
FIG. 4 is a view similar to FIG. 2, showing a modification of the optical system according to the present invention in which an additional decentered auxiliary aperture is employed.

Referring to the modification shown in FIG. 4, the additional decentered auxiliary aperture 45 is disposed on one side of the primary aperture 40 remote from the decentered auxiliary aperture 41 and adjacent to the liquid crystal panel 34. Since the auxiliary aperture 41 is offset in the direction X relative to the optical axis of the projection lens assembly 37, the additional decentered auxiliary aperture 45 is offset laterally in a direction counter to the direction X. The size and the amount of lateral offset of the additional decentered aperture 45 employed in accordance with the modification of the present invention may be chosen in a manner similar to that described in connection with those of the decentered auxiliary aperture 41.

In describing the foregoing embodiment, the primary aperture 40 in each of the first to third projection lens assemblies 37 to 39 has been described coaxial with the optical axis of the corresponding projection lens assembly 37 to 39. However, in the second embodiment of the present invention shown in FIGS. 5(a) and 5(b), both of the primary and auxiliary apertures, now identified by 50 and 51, 52 and 53, respectively, are decentered relative to the optical axes of the associated first to third projection lens assemblies 37 to 39.

Figure 5A:
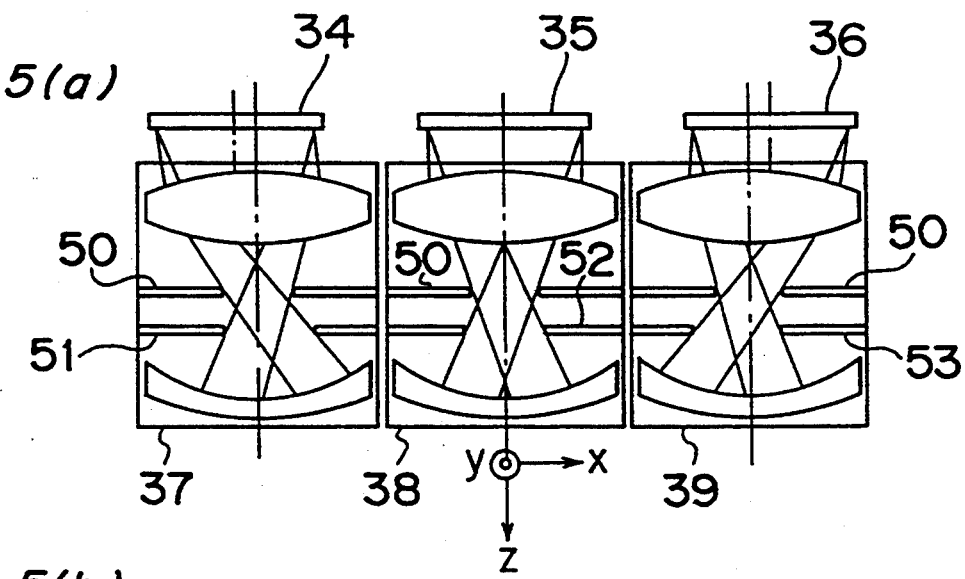
FIGS. 5(*a*) and 5(*b*) illustrate an important portion of the image projection system according to an alternative embodiment of the present invention, wherein FIG. 5(*a*) illustrates an layout of projection lens assemblies and FIG. 5(*b*) how primary and auxiliary apertures are decentered relative to the optical axes of those projection lens assemblies.
Figure 5B:
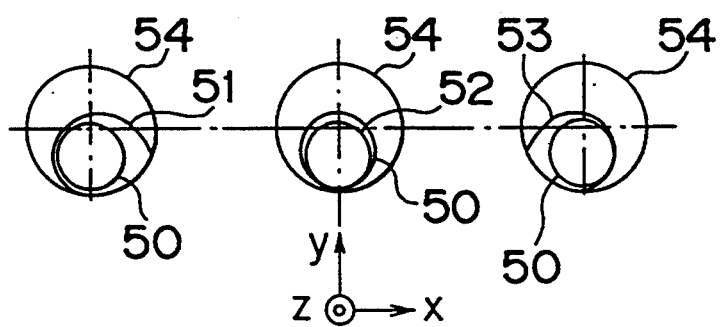

As best shown in FIG. 5(b) showing respective pupils 54 of the first to third projection lens assemblies 37 to 39 as viewed from the side of the screen, the primary apertures 50 in these projection lens assemblies 37 to 39 are equally decentered in a direction shown by the arrow Y (corresponding to the vertical direction of the screen) relative to the associated optical axes of the first to third projection lens assemblies 37 to 39. On the other hand, the auxiliary aperture 52 employed in the second, that is, intermediate, projection lens assembly 38 is decentered in a direction parallel to the direction in which the mating primary aperture 50 in the projection lens assembly 38 is decentered, whereas each of the auxiliary apertures 51 and 53 employed in the first and third projection lens assemblies 37 and 39 are decentered relative to the respective optical axes of the first and third projection lens assemblies 37 and 39 in a vector direction delimited between the directions X and Y, but in a sense opposite to each other. In addition, each of the decentered auxiliary apertures 51 and 53 offset in the vector direction is so shaped to represent the shape of a pupil that the vignetting factor can be restricted only by a portion of the pupil of the respective decentered auxiliary aperture 51 or 53. As is the case with the foregoing embodiment, the size and the amount of offset of each of the decentered auxiliary apertures 51 and 53 are so chosen that the light fluxes projected on an arbitrarily chosen point of the screen through the projection lens assemblies 37 to 39 represent an equal illuminance.

According to the embodiment shown in FIGS. 5(a) and 5(b), the F-number of each of the projection lens assemblies 37 to 39 has to be of a value smaller than that in the foregoing embodiment.

Figure 6:
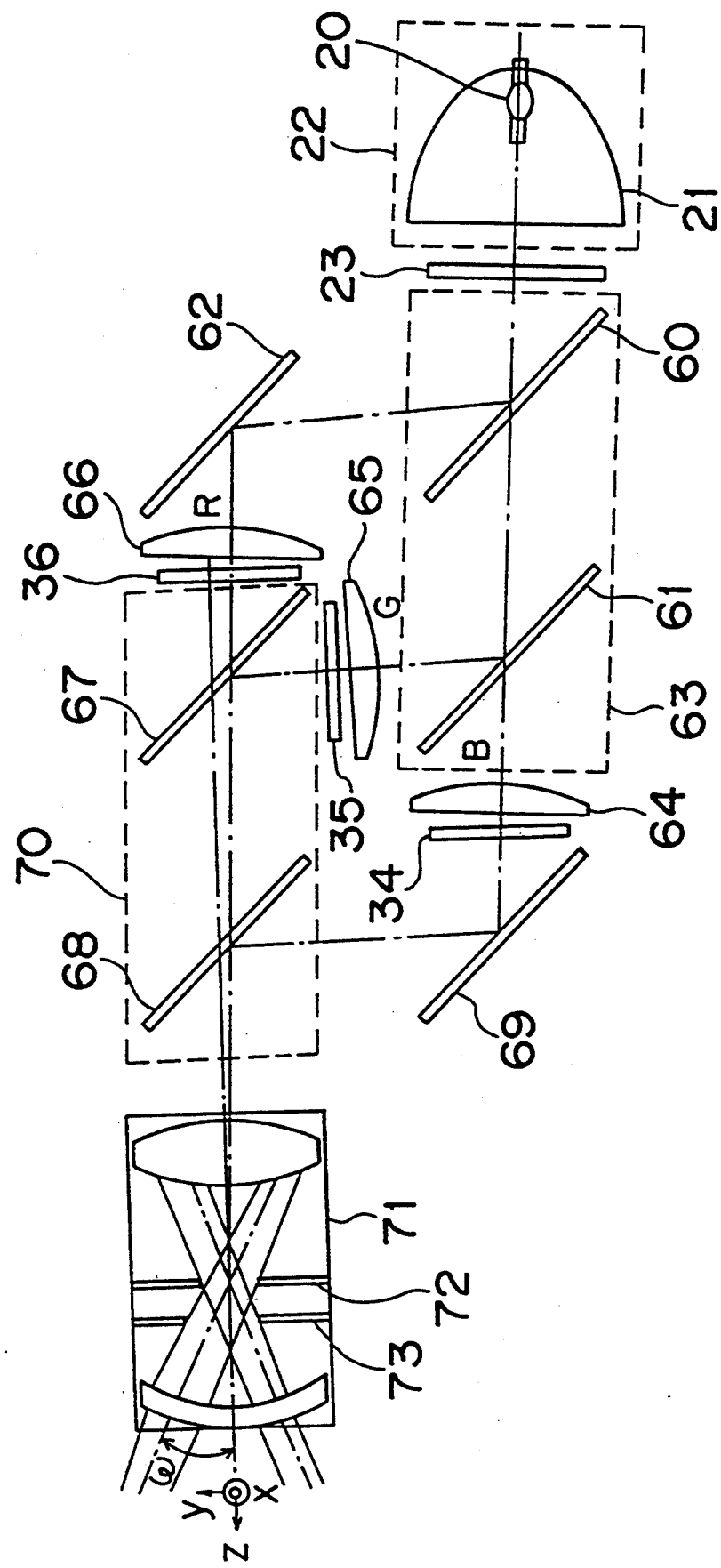
FIG. 6 is a schematic side view of the image projection system according to a further preferred embodiment of the present invention.
Figure 7:
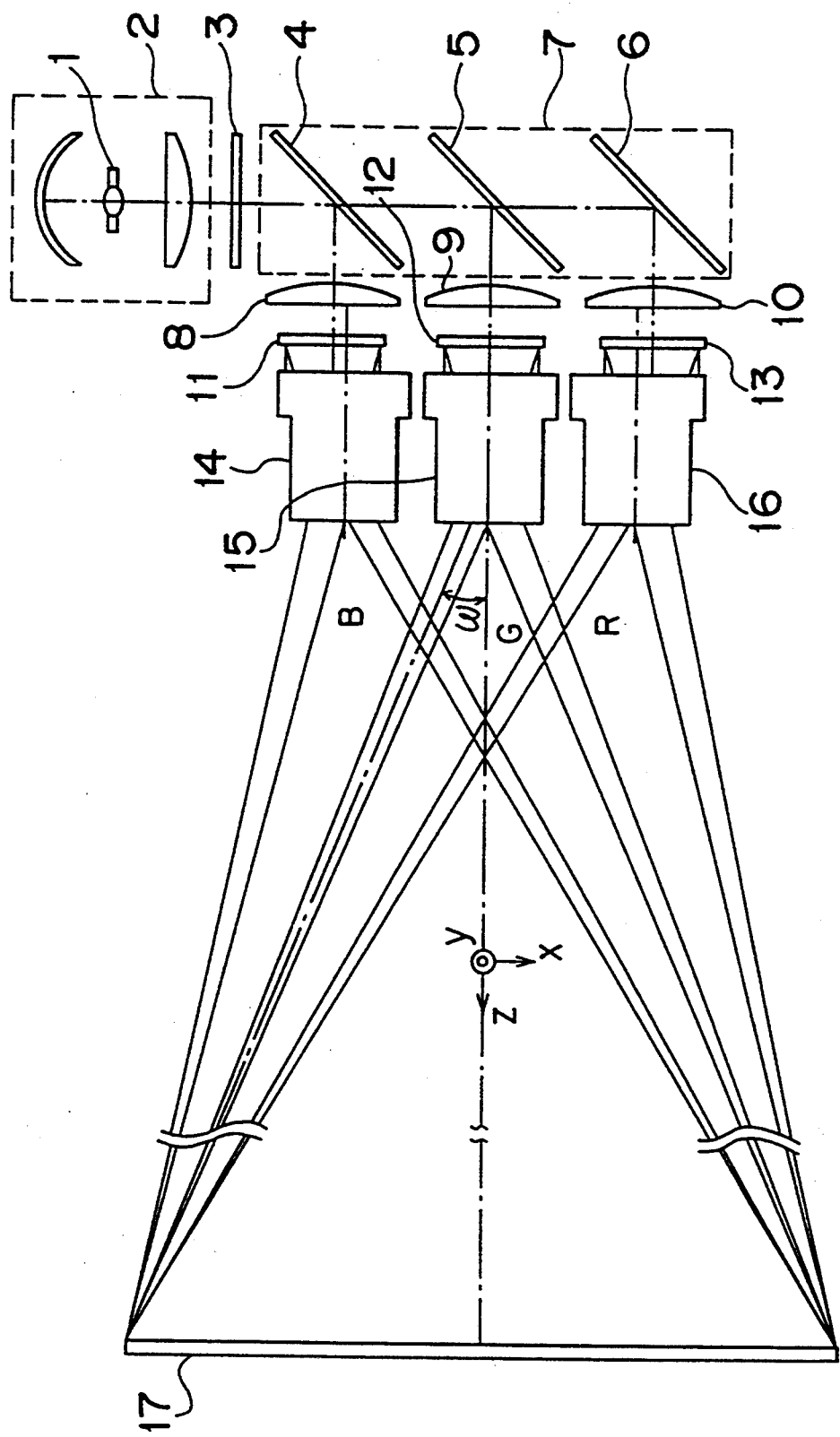
FIG. 7 is a schematic side view of the prior art image projection system.
Figure 8:
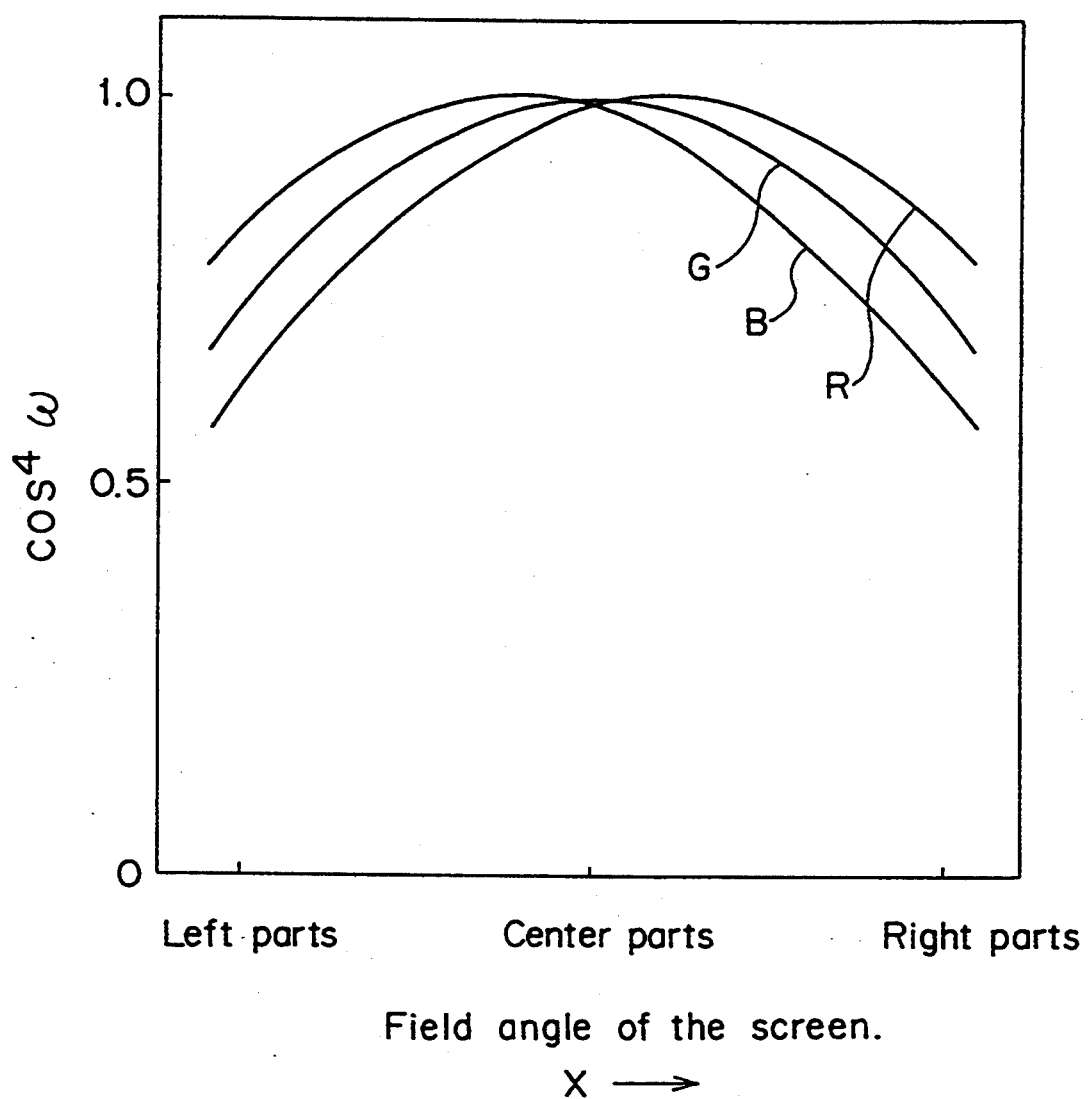
FIG. 8 is a graph showing a pattern of distribution of illuminance of each image, formed on the screen by the respective blue, green and red imagewise beams projected by the associated projection lens, with respect to the fourth power of the cosine of the field angle ($\cos^4 \omega$) of the associated projection lens.

Referring now to FIG. 6, the image projection system according to the third preferred embodiment of the present invention will be described. The image projection system shown therein includes a light source 22 including a lamp 20 such as, for example, a metal halide lamp, a xenon lamp or a halogen lamp, and a concave mirror 21; a cut-off filter 23 capable of reflecting ultraviolet and infrared regions of wavelength; a color separating optical means 27; first to third field lenses 64, 65 and 66; and first to third liquid crystal panels 34, 35 and 36 each being of the same design as that employed in the foregoing embodiments. The system shown in FIG. 6 differs from that shown in FIG. 1 in that, in the system of FIG. 6, a color combining optical means 70 including dichroic mirrors 67 and 68 is employed and, also, instead of the three projection lens assembly in the foregoing embodiment, only a single projection lens assembly identified by 71 is employed.

According to the optical system shown in FIG. 1, rays of light emitted from the lamp 20 are, after the ultraviolet and infrared regions of wavelength have been reflected by the cut-off filter 23, transformed to the color separating optical means 27. The rays of light entering the color separating optical means 27 are separated successively by red-reflecting and blue-reflecting dichroic mirrors 60 and 61 into blue, green and red light components which are subsequently transmitted through the field lenses 64 to 66 to the respective liquid crystal panels 34 to 36. The three liquid crystal panels are so disposed that geometric centers of respective image forming planes of the first to third liquid crystal panels 34 to 36 are offset in a direction conforming to a vertical scanning direction while the liquid crystal panels themselves are displaced parallel to the optical axis of the projection lens assembly 71.

Optical images in blue, green and red color which are formed by the liquid crystal panels 34 to 36 are subsequently combined together by the color combining optical means 70 including the green-reflecting and blue-reflecting dichroic mirrors 67 and 68, to provide a composite color image which is then projected on the screen through the projection lens assembly 71 thereby to effect a display of the color picture on the screen. The projection lens assembly 71 includes a primary aperture 72 for regulating the on-axis light flux and an auxiliary aperture 73 for regulating the off-axis light flux, said auxiliary aperture 73 being offset, i.e., decentered, in a direction parallel to the direction in which the liquid crystal panels are displaced laterally with respect to the optical axis of such projection lens assembly 71.

In the optical system shown in FIG. 6, each of the liquid crystal panels 36 to 39 is inclined several degrees relative to the optical axis of the projection lens assembly 71 so that a particular angle of incidence of light can result in an optimum contrast ratio. Because of this, in order to allow the rays of light passing through the image forming center of each of the liquid crystal panels 34 to 36 to give an optimum contrast ratio, the liquid crystal panels 34 to 36 are displaced parallel relative to the optical axis of the projection lens assembly 71 and, at the same time, an optical axis of the light source 22 is aligned with the path along which the principal rays of light passing through the image forming centers of the liquid crystal panels and also passing through the optical axis of the projection lens assembly 71.

It is to be noted that, when the liquid crystal panels 34 to 36 are so disposed with their image forming centers displaced relative to the optical axis of the projection lens assembly 71, the field angle $\omega$ of the projection lens assembly 71 differs between upper and lower portions of the projected color picture and, therefore, in accordance with the fourth power of the cosine of the field angle in the equation (1) above, the upper and lower portions of the projected color picture exhibit a varying illuminance.

To compensate for this variation in illuminance at the upper and lower portions of the projected color picture, the vignetting factor is to be controlled according to the difference in field angle ώ at the upper and lower portions of the projected color picture. This can be accomplished by the use of the auxiliary aperture 73 which is disposed on one side of the primary aperture 72 adjacent the screen and is decentered in a direction parallel to the direction of displacement of the liquid crystal panels 34 to 36. This decentered auxiliary aperture 73 serves to increase the vignetting factor with respect to the upper portion of the projected color picture at which the field angle ώ tends to be large and to decrease the vignetting factor with respect to the lower portion of the projected color picture at which the field angle ω tends to be small. By so doing, the varying illuminance at the upper and lower portions of the projected color picture can be substantially eliminated.

It is to be noted that, as is the case with the modification shown in FIG. 3, the single projection lens assembly 71 shown in FIG. 6 may have an extra decentered auxiliary aperture in addition to the decentered auxiliary aperture 73. In such case, this additional auxiliary aperture should be disposed on one side of the primary aperture 72 remote from the decentered auxiliary aperture 73.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An image projection system which comprises:
   a light source;
   a color separating optical means for separating rays of light from the light source into blue, green and red light components;
   first to third light valves each operable to modulate the associated light component in response to a video signal applied thereto thereby to form an image in a corresponding color, each of said first to third light valves having a respective image forming center;
   first to third projection lens assemblies associated with the first to third light valves for projecting imagewise modulated light components, carrying the images formed respectively by the first to third light valves, onto a screen in a superimposed fashion to provide a color picture, said first and third light valves positioned on respective sides of the second light valve and also positioned with their image forming centers displaced relative to the associated optical axes of the first and third projection lens assemblies; and
   aperture stops provided in the first and third projection lens assemblies, each of said aperture stops being decentered relative to the optical axis of the first or third projection lens assembly in a direction parallel to the direction of displacement of the associated first or third light valve.

2. The image projection system as claimed in claim 1, further comprising a primary aperture provided in each of the first to third projection lens assemblies in coaxial relation with the optical axis of the respective projection lens assembly, and wherein each of said decentered aperture stops is disposed in the vicinity of the primary aperture and on one side of the primary aperture adjacent the screen.

3. The image projection system as claimed in claim 1, further comprising an additional aperture stop provided in each of the first and third projection lens assemblies.

4. The image projection system as claimed in claim 3, further comprising a primary aperture provided in each of the first to third projection lens assemblies in coaxial relation with the optical axes of the respective first to third projection lens assemblies, and wherein said aperture stop and said additional aperture stop in each of the first and third projection lens assemblies are disposed on respective sides of the primary aperture in the corresponding projection lens assembly.

5. The image projection system as claimed in claim 1, wherein said aperture stop has a shape of a round opening.

6. The image projection system as claimed in claim 1, wherein said aperture stop has a shape of a pupil.

7. The image projection system as claimed in claim 1, wherein each of said first to third light valves is a liquid crystal panel.

8. An image projection system which comprises:
   a light source;
   a color separating optical means including first to third dichroic mirrors for separating rays of light from the light source into blue, green and red light components;
   first to third light valves each operable to modulate the associated light component in response to a video signal applied thereto thereby to form an image in a corresponding color, each of said first to third light valves having a respective image forming center;
   first to third projection lens assemblies associated with the first to third light valves for projecting imagewise modulated light components, carrying the images formed respectively by the first to third light valves, onto a screen in a superimposed fashion to provide a color picture, said first and third light valves positioned on respective sides of the second light valve and also positioned with their image forming centers displaced relative to the associated optical axes of the first and third projection lens assemblies; and
   aperture stops provided in the first and third projection lens assemblies, each of said aperture stops being decentered relative to the optical axis of the first or third projection lens assembly in a direction parallel to the direction of displacement of the associated first or third light valve for controlling a bundle of light passing through the first or third projection lens assembly in dependence on a field angle thereof.

9. The image projection system as claimed in claim 8, further comprising a primary aperture provided in each of the first to third projection lens assemblies in coaxial relation with the optical axis of the respective projection lens assembly, and wherein each of said decentered aperture stops is disposed in the vicinity of the primary aperture and on one side of the primary aperture adjacent the screen.

10. The image projection system as claimed in claim 8, further comprising an additional aperture stop provided in each of the first and third projection lens assemblies.

11. The image projection system as claimed in claim 10, further comprising a primary aperture provided in each of the first to third projection lens assemblies in coaxial relation with the optical axes of the respective first to third projection lens assemblies, and wherein said aperture stop and said additional aperture stop in each of the first and third projection lens assemblies are disposed on respective sides of the primary aperture in the corresponding projection lens assembly.

12. The image projection system as claimed in claim 8, wherein said aperture stop has a shape of a round opening.

13. The image projection system as claimed in claim 8, wherein each of said first to third light valves is a liquid crystal panel.

14. An image projection system which comprises:
a light source;
a color separating optical means for separating rays of light from the light source into blue, green and red light components;
first to third light valves each operable to modulate the associated light component in response to a video signal applied thereto thereby to form an image in a corresponding color, each of said first to third light valves having a respective image forming center;
a color combining optical means for combining together the imagewise modulated blue, green and red light components emerging from the first to third light valves;
a projection lens assembly for projecting the imagewise modulated light components, carrying the images formed respectively by the first to third light valves, onto a screen in a superimposed fashion to provide a color picture, said first and third light valves being positioned on respective sides of the second light valve and also positioned with their image forming centers displaced relative to the optical axis of the projection lens assembly; and
an aperture stop provided in the projection lens assembly and decentered relative to the optical axis of the projection lens assembly in a direction parallel to the direction of displacement of any one of the light valves.

15. The image projection system as claimed in claim 14, further comprising a primary aperture provided in said projection lens assembly in coaxial relation with the optical axis thereof, and wherein said decentered aperture stop is disposed in the vicinity of the primary aperture and on one side of the primary aperture adjacent the screen.

16. The image projection system as claimed in claim 14, further comprising an additional aperture stop provided in said projection lens assembly.

17. The image projection system as claimed in claim 16, further comprising a primary aperture provided in said projection lens assembly in coaxial relation with the optical axis thereof, and wherein said aperture stop and said additional aperture stop in said projection lens assembly are disposed on respective sides of the primary aperture in the projection lens assembly.

18. The image projection system as claimed in claim 14, wherein said aperture stop has a shape of a round opening.

19. The image projection system as claimed in claim 14, wherein said aperture stop has a shape of a pupil.

20. The image projection system as claimed in claim 14, wherein each of said first to third light valves is a liquid crystal panel.

* * * * *